US012730492B2

(12) United States Patent
Brockhurst et al.

(10) Patent No.: US 12,730,492 B2
(45) Date of Patent: Sep. 8, 2026

(54) SYSTEM AND METHOD OF ENTERING A LOW POWER MODE FOR A BATTERY ELECTRIC MACHINE

(71) Applicant: Caterpillar Inc., Peoria, IL (US)

(72) Inventors: Russell A. Brockhurst, Carindale (AU); Ruchi P. Bhatia, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 81 days.

(21) Appl. No.: 18/394,257

(22) Filed: Dec. 22, 2023

(65) Prior Publication Data

US 2025/0208686 A1 Jun. 26, 2025

(51) Int. Cl.
*G06F 1/3212* (2019.01)

(52) U.S. Cl.
CPC .................................. *G06F 1/3212* (2013.01)

(58) Field of Classification Search
None
See application file for complete search history.

(56) References Cited

U.S. PATENT DOCUMENTS 4,229,688 A 10/1980 Knox
7,962,768 B2 6/2011 Grill
8,261,101 B1 * 9/2012 Wijaya .................. G06F 1/3243 326/38
9,354,926 B2 * 5/2016 King-Smith .......... G06F 9/4843
9,745,723 B2 8/2017 Inoue
11,145,144 B2 10/2021 Manji
11,697,917 B2 7/2023 Myers
2012/0131365 A1 * 5/2012 Tabone ................. G06F 1/3203 713/320
2018/0081420 A1 * 3/2018 Jones .................... G06F 1/3243
2019/0034229 A1 * 1/2019 Guo ...................... G06F 9/4881
2019/0116029 A1 * 4/2019 Pandey ................. H04L 63/068

(Continued)

FOREIGN PATENT DOCUMENTS

CN 207677499 U 7/2018
CN 111322400 A 6/2020

(Continued)

OTHER PUBLICATIONS

Written Opinion and International Search Report for Int'l. Patent Appln. No. PCT/US2024/056447, mailed Mar. 10, 2025 (14 pgs).

*Primary Examiner* — Paul Yen

(57) ABSTRACT

A system and method for entering a low power mode of operation of a battery electric machine (BEM) are provided. The method includes determining a location of a battery electric machine (BEM) allocated to a production circuit; determining a location of a charging station compatible with the BEM; based at least in part on the location of the BEM, the location of the charging station, and the production circuit, determining a plurality of tasks of the BEM for executing the production circuit, predicting a corresponding duration of each task of the plurality of tasks, and predicting a corresponding energy use of each task of the plurality of tasks; initiating the BEM to perform a task of the plurality of tasks; and causing the BEM to enter a low power mode of operation based at least in part on the predicted corresponding duration and the predicted corresponding energy use of the task.

20 Claims, 8 Drawing Sheets

(56) References Cited

U.S. PATENT DOCUMENTS

| | | | | |
|---|---|---|---|---|
| 2020/0257605 | A1* | 8/2020 | Suzuki | G06F 11/3006 |
| 2021/0072038 | A1 | 3/2021 | Inoue et al. | |
| 2022/0350708 | A1* | 11/2022 | Vishwakarma | G06F 11/1458 |
| 2023/0166632 | A1* | 6/2023 | Braunstein | G01R 31/382 320/109 |
| 2023/0194281 | A1 | 6/2023 | Thomas et al. | |

FOREIGN PATENT DOCUMENTS

| | | | |
|---|---|---|---|
| CN | 115520124 | A | 12/2022 |
| CN | 116796936 | A | 9/2023 |

* cited by examiner

SYSTEM AND METHOD OF ENTERING A LOW POWER MODE FOR A BATTERY ELECTRIC MACHINE

TECHNICAL FIELD

The present disclosure relates generally to a system and method for managing battery energy of a machine, and more particularly, to a system and method for entering a low power mode of operation of a battery electric machine.

BACKGROUND

When designing Battery Electric Machines (BEMs), an engineering trade-off may be made between battery weight and productive capacity. While heavier and larger batteries can store more energy, extra weight of the batteries reduces productive capacity, for example, an additional ton of battery weight on a haul truck reducing payload capacity of the haul truck by the same amount. Using smaller batteries may optimize productive capacity of a BEM where energy use of the BEM is predictable and the BEM may be charged just in time. However, the use of small batteries may be problematic where the energy use is not predictable.

BEMs are commonly charged at a charging station, and may be driven to the charging station and charged at the location of the charging station. BEMs consume energy while idle, and systems, such as battery cooling systems, remain ready to work. There is a risk that, being required to stop or idle for extended periods, a BEM with small batteries will run out of energy during planned or unplanned stops, such as medical emergencies, extreme weather events, road closures, and/or queuing. Even where a BEM does not run out of energy during an extended stop, it may be left with insufficient energy to continue working, travel to the charge station, or queue at the charge station. To minimize energy use during extended idle periods, the BEM may enter a low power mode before returning to an active mode for beginning or resuming work.

One example of adjusting operating parameters of a machine in anticipation of a transition from a current operational state to a predicted subsequent operational state is disclosed in U.S. Pat. No. 11,697,917B2 of Myers et al., that was issued on Jun. 11, 2023 ("the '917 patent"). In particular, the '917 patent discloses an electronic controller receiving a data stream indicative of actuator settings, sensor outputs, and/or operator control settings; applying a pattern detection AI to determine a current operational state of the machine based on patterns detected in the data stream; applying a reinforcement learning to produce as an output one or more target operating parameters based on a predicted subsequent operational state of the machine; applying the one or more target operating parameters to the machine; and monitoring the performance metric of the machine.

Although useful in determining a current operational state of the machine, the electronic controller of the '917 patent may be limited. In particular, the '917 patent describes limited and repeated operational states of a lift-and-carry operation including lifting the material at a first location, traveling to a second location, releasing the material at the second location, and returning to the first location.

The systems and methods described herein are directed to addressing one or more of the drawbacks set forth above.

SUMMARY

According to a first aspect, a method includes determining a location of a battery electric machine (BEM) allocated to a production circuit; determining a location of a charging station compatible with the BEM; based at least in part on the location of the BEM, the location of the charging station, and the production circuit: determining a plurality of tasks of the BEM for executing the production circuit, predicting a corresponding duration of each task of the plurality of tasks, and predicting a corresponding energy use of each task of the plurality of tasks; initiating the BEM to perform a task of the plurality of tasks; and causing the BEM to enter a low power mode of operation based at least in part on the predicted corresponding duration and the predicted corresponding energy use of the task.

According to another aspect, a system is provided for entering a low power mode of operation of a battery electric machine (BEM). The system includes a processor and a memory communicatively coupled to the processor. The memory stores thereon processor-executable instructions that, when executed by the processor, cause the processor to: determine a location of a battery electric machine (BEM) allocated to a production circuit; determine a location of a charging station compatible with the BEM; based at least in part on the location of the BEM, the location of the charging station, and the production circuit, determine a plurality of tasks of the BEM for executing the production circuit, predict a corresponding duration of each task of the plurality of tasks, and predict a corresponding energy use of each task of the plurality of tasks; initiate the BEM to perform a task of the plurality of tasks; cause the BEM to enter a low power mode of operation based at least in part on the predicted corresponding duration and the predicted corresponding energy use of the task; and cause the BEM to enter the low power mode responsive to determining to suspend the task being performed.

According to yet another aspect, non-transitory computer-readable medium is provided that stores thereon processor-executable instructions that, when executed by a processor of a system, cause the processor to perform certain operations for causing a battery electric machine (BEM) to enter a low power mode of operation. The operations include determining a location of a battery electric machine (BEM) allocated to a production circuit; determining a location of a charging station compatible with the BEM; based at least in part on the location of the BEM, the location of the charging station, and the production circuit, determining a plurality of tasks of the BEM for executing the production circuit, predicting a corresponding duration of each task of the plurality of tasks, and predicting a corresponding energy use of each task of the plurality of tasks; initiating the BEM to perform a task of the plurality of tasks; causing the BEM to enter the low power mode based at least in part on the predicted corresponding duration and the predicted corresponding energy use of the task; and causing the BEM to enter the low power mode responsive to determining to suspend the task being performed.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
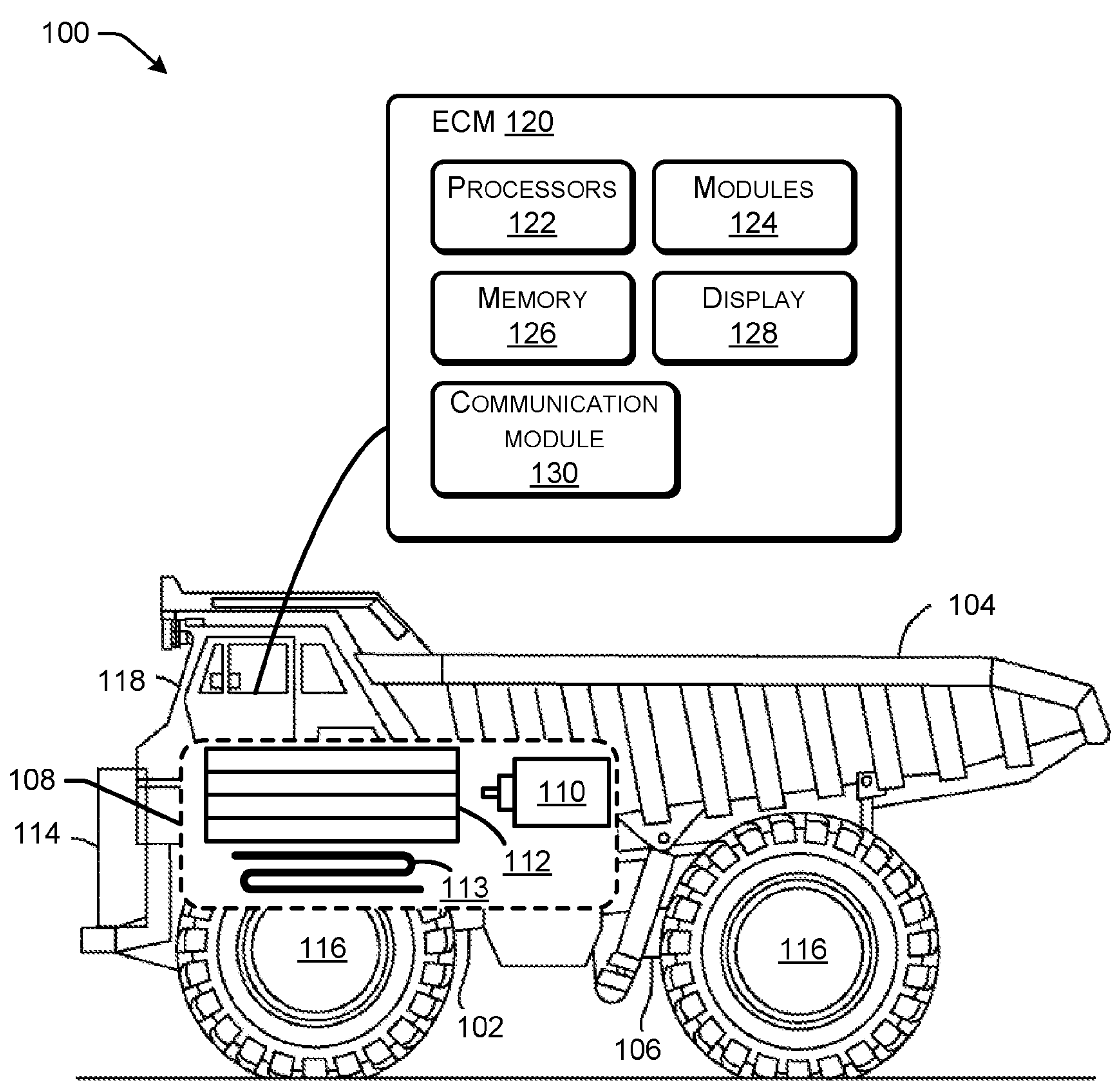
FIG. 1 is a side view of an exemplary machine that may utilize reserving power for a battery electric machine (BEM).

FIG. 1 is a side view of an exemplary battery electric machine (BEM) 100, according to one embodiment of the present disclosure. While the BEM 100 is depicted as a haul truck, it should be noted that the BEM 100 may include any type of battery electric machine, such as an automobile, a truck, an agricultural vehicle, an aircraft, a watercraft, and/or work vehicles, such as a track loader, a skid-steer loader, a grader, an on-highway truck, an off-highway truck, and/or any other machine known to a person skilled in the art.

The BEM 100 may include a chassis and/or a frame 102. A dump body 104 may be fixedly or pivotally mounted on the frame 102. The dump body 104 may be used for transportation of a payload of material like sand, gravel, stones, soil, excavated material, and the like from one location to another on a worksite on which the BEM 100 is deployed.

Hydraulic and/or pneumatic cylinders 106 may be mounted on the frame 102 and connected to the dump body 104 to enable movement in the form of tilting of the dump body 104 with respect to the frame 102 of the BEM 100. The tilting of the dump body 104 may result in the payload contained within the dump body 104 to be deposited on a ground surface behind the BEM 100. In some embodiments, the distance behind the BEM 100 that the payload is deposited may be determined and stored for more accurate positioning of the BEM 100 at a target position.

A powertrain or a drivetrain 108 (shown in a cutout) may be provided on the BEM 100 for the production and transmission of motive power. The powertrain 108 may include an electric motor 110 and one or more batteries 112. An enclosure 114 may be provided on the frame 102 of the BEM 100 which may house the electric motor 110, batteries 112, and a battery cooling system 113.

A set of ground engaging members 116, like wheels, may be provided to the BEM 100 for the purpose of mobility. The set of ground engaging members 116 may be steerable, or configured to turn, in order to turn the frame of the BEM 100 along a turning profile. In some embodiments, the front two ground engaging members 116 are configured to turn. The powertrain 108 may further include a torque convertor, transmission inclusive of gearing, drive shafts, propeller shaft, differentials, and other known drive links for transmission of motive power from the electric motor 110 to the at least one ground engaging member 116 in the plurality of ground engaging members 116. An operator cabin 118 may be provided on the BEM 100 which may house the various controls of the BEM 100.

For example, the BEM 100 may include an electronic control module (ECM) 120, with which the various controls of the BEM 100 may be performed. The ECM 120 may house one or more processors 122, which may execute any modules, components, or systems associated with the BEM 100, some of which may be housed in the ECM 120 as shown as modules 124. In some examples, the processors 122 may include a central processing unit (CPU), a graphics processing unit (GPU), both CPU and GPU, or other processing units or components known in the art. Additionally, each of the processors 122 may possess its own local memory, which also may store program modules, program data, and/or one or more operating systems. The ECM 120 may additionally include a user interface, such as a display 128 that displays various information and receives inputs via a touch-sensitive screen, and a communication module 130 to communicate with other BEMs or work vehicles on the worksite and a central office.

Computer-readable media, such as memory 126, associated with the BEM 100 may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the BEM 100. In some examples, one or more of the modules may include or be associated with computer-executable, or processor-executable, instructions that are stored by the computer-readable media and that are executable by one or more processors to perform such operations.

The BEM 100 may be configured to receive a task, such as to transport materials from one location to another at a worksite. The task, which is associated with a corresponding movement pattern of the BEM 100, may be received via the ECM 120. For example, the BEM 100 may maneuver to a first target position to receive a payload in its dump body 104 from an excavating machine, transport the payload to a second target position, and dump the payload at the second target position. Each of the first and second target positions may be associated with a target location for the BEM 100 and a target orientation for the BEM 100 (e.g., a heading direction for the BEM 100). Other example target positions may include parking spots, maintenance spots, refueling spots, any other pre-decided destination, and the like.

BEMs 100 may be manned machines, autonomous machines, and/or semi-autonomous machines. Human operators may operate, control, or direct some or all of the functions of manned or semi-autonomous machines. However, in examples in which the BEM 100 is autonomous or semi-autonomous, the speed, steering, work tool positioning/movement, and/or other functions of the BEM 100 may be fully or partially controlled automatically or semi-automatically by on-board or off-board controllers or other computing devices, such as computing devices with processors executing computer-readable instructions configured to control the BEM 100 autonomously or semi-autonomously.

Figure 2:
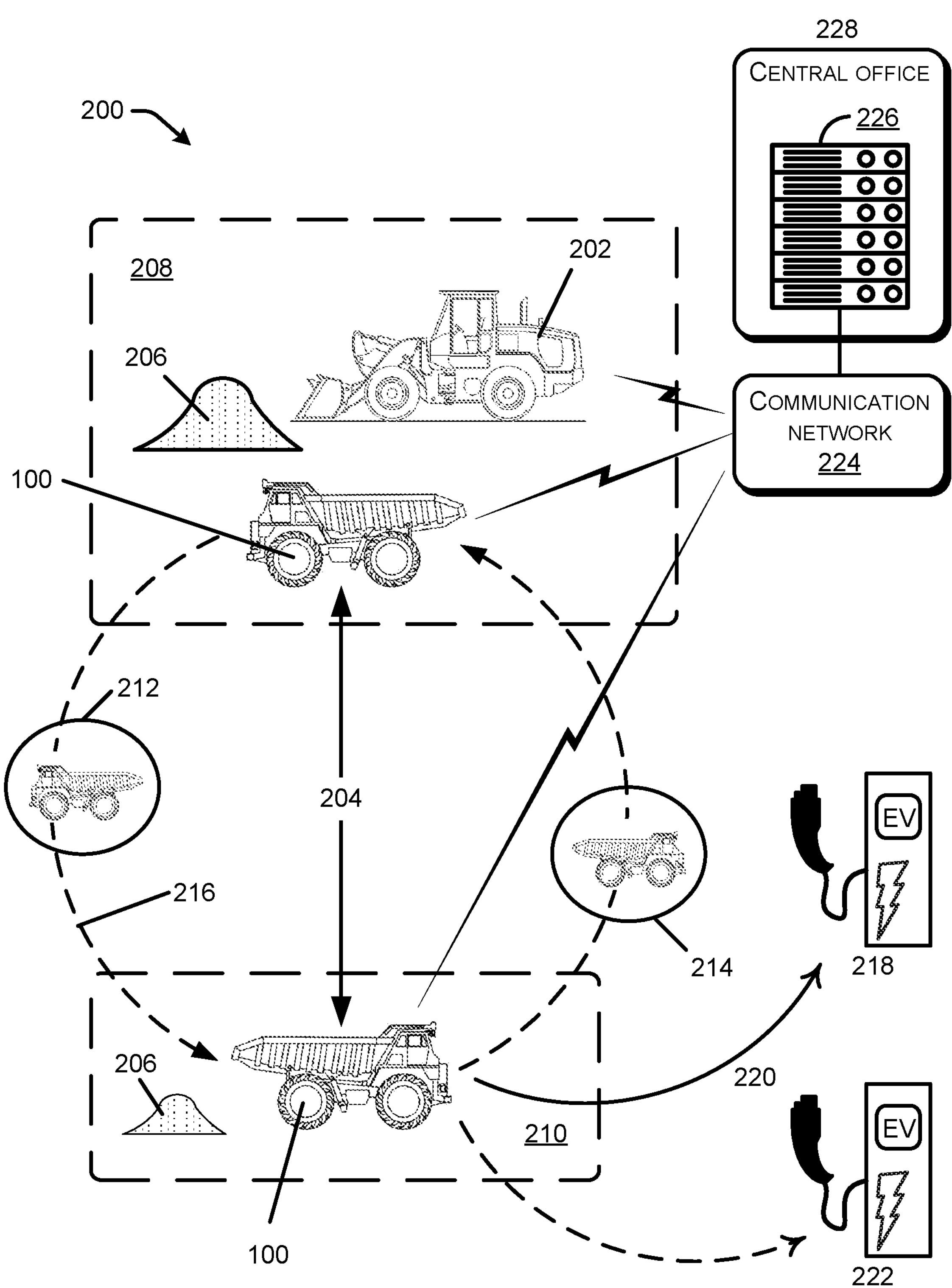
FIG. 2 is an example worksite where a set of machines are deployed.

FIG. 2 depicts an example worksite 200 where machines, such as BEMs 100 and 202 may be deployed. The worksite 200 may be a construction site, a mine site, a quarry, or any other type of worksite or work environment where one or more BEMs 100 and 202 may be deployed to perform one or more work tasks. In some examples, a worksite 200 may be considered to be a process site or a project site. In a process site, one or more machines may repeatedly perform a set of tasks. As an example, a process site may be a quarry or a mine site where the BEM 100 repeatedly moves rocks away from a rock face. In a project site, one or more BEMs 100 and 202 may perform different tasks as a project progresses over time. As an example, a project site can be a construction site, a paving site, or other work environment where the BEMs 100 and 202 perform different tasks as different stages of construction are reached. In other examples, the worksite 200 may have elements of both a process site and a project site.

As discussed above, the BEMs 100 and 202 on the worksite 200 may perform a variety of tasks. In some examples, the BEMs 100 may repeatedly perform a set of planned tasks associated with segments of a production circuit, where a planned task energy amount, i.e., an amount of energy required to perform each of the planned tasks or segments, is known, for example, from historical performance of the planned task, a heuristic algorithm for estimating the planned task energy amount, a simulation of the planned task, a stochastic model, or modeling, for the planned task, or a machine learning, including reinforcement learning, for the planned task. The set of planed tasks include active tasks and idle tasks.

A production circuit has an associated energy use profile (by segment) including nominal target charge range for charging, charge range for operation, reserve energy limit, and predicted energy use and/or gain. A production circuit is a sequence of activities to be performed by a machine one or more times, and where a production circuit is to be performed more than once, the production circuit may start and end at the same location or a different locations. During an active task, the BEM 100 may be performing a task that requires high power mode of operation, where various components of the BEM are engaged to perform the active task. For instance, an example simple production circuit may include a loading segment, a loaded transit segment, an unloading segment, and an unloaded transit segment. Such an example production circuit 204 is shown in FIG. 2, where the BEM 100 can be loaded with dirt or other material 206 at a loading zone 208 within the worksite 200, the BEM 100 can transport the material 206 from the loading zone 208 to a separate delivery zone 210 within the worksite 200, the BEM 100 can unload the material 206 at the delivery zone 210, and the BEM 100 can then travel back to the loading zone 208 to be loaded with more material 206 for a next iteration of the production circuit 204. During an idle period between two active tasks, the BEM 100 may enter a low power mode where power is supplied only to required or essential components of the BEM 100 for minimum functionality of the BEM 100. For example, while the BEM 100 is at rest during an idle period in the low power mode, the ECM 120 may continue receiving power to remain active for monitoring various functions, operations, and status of the BEM 100 and for communicating with other BEMs while the electric motor 110 powering the powertrain 108, the hydraulic cylinders 106, and the battery cooling system 113 may be turned off, i.e., by not receiving power.

In some examples, the BEM 100 may load and/or unload material 206 by itself during one or more segments of the production circuit 204. However, in other examples, the BEM 202 may load and/or unload material 206 for the BEM 100 during the production circuit 204. For instance, an excavator or other loading machine can be positioned at a loading zone 208 and be configured to load material 206 onto trucks, such as the BEM 100, which can then transport the material 206 to one or more delivery zones 210. In some examples, such trucks may themselves dump or otherwise deliver the material 206 at delivery zones 210. However, in other examples, another excavator or other type of unloading machine can be positioned at a delivery zone 210 to unload material 206 from trucks.

Other examples of a production circuit include, but not limited to: a complex circuit-starting at a first loading tool, loading, travelling to a dump, dumping, travelling to a second loading tool, loading, travelling to a lime silo, receiving a dose of lime, travelling to a second dump, dumping, returning to the first loading tool; watering-travelling to a location, watering a road, watering another road, travelling, watering a plan area, traveling, watering another road, travelling to a water refill station; grading-travelling to a location, grading, travelling to another location, grading, travelling to a park up; and wheel loader-travelling to a location, loading trucks, travelling to a location, cleaning up a dump, travelling to a location, repairing a road, travelling to a location, loading trucks.

More than one BEM 100 may follow the same production circuit 204 on the worksite 200. For instance, in the example shown in FIG. 2, a first truck may be being loaded with material 206 at the loading zone 208 at the same time a previously-loaded second truck may be unloading material 206 at a delivery zone 210. Similar trucks already loaded with material 206 may be in transit from the loading zone 208 to the delivery zone 210, and may for example be located at a first position 212. Other trucks may have finished delivering loads of material 206 and be in transit from the delivery zone 210 back to the loading zone 208, and may for example be located at a second position 214.

Accordingly, BEMs 100 that are performing the same production circuit 204 may move along substantially the same route 216 through the worksite 200 as they perform and transition between different segments of the production circuit 204. Additionally, a BEM 100 may perform substantially the same operations as other BEMs 100 when the BEM 100 are at the same or similar locations along the route 216 through the worksite 200. As an example, when a production circuit 204 involves BEMs 100 (haul trucks) moving from the loading zone 208 to a delivery zone 210, each BEM 100 may be likely to perform the same or similar operations associated with dumping material 206 when they reach the delivery zone 210, even though individual BEMs 100 may arrive at the delivery zone 210 at different times. At some point in time after performing the production circuit 204, as a part of the planned tasks, the BEM 100 will need to be recharged, and may travel to a closest charging station 218 along a predetermined route 220. Additionally, or alternatively, another route for the BEM 100 to reach a second closest charging station 222 may be provided.

In some examples, the BEM 100 on the worksite 200 may communicate via a communication network 224 with a computing system 226, such as a computer, server, or other computing element in a central office 228 located away from the BEM 100. For example, the communication network 224 may be a cellular network, Wi-Fi® network, or any other type of network. In some examples, the BEM 100 may use the communication network 224 to report location data and/or other types of data to the computing system 226, such that the computing system 226 may track the location of the BEM 100 on the worksite 200, and the computing system 226 may communicate data and instructions to the BEM 100 via the communication network 224.

The BEM 100 may be one of a plurality of BEM on the worksite 200, and the computing system 226 in the central office 228 perform a site-wide optimization and assign each BEM a predicted idle time and a predicted return to work time. These assignments may include predicted energy use for some period after the machine returning to work. The computing system 226 and the ECM 120 may use heuristic and/or machine learning to determine when to enter the low power mode. For example, the BEM 100 may enter the low power mode immediately at the time it is predicted to be idle for an extended period. In other situations, the BEM 100 may refrain from entering the low power mode or delay entering the low power mode automatically or based on inputs from an operator.

Machine learning may be used to minimize delays to return to work, minimize startup time, minimize energy use, and minimize battery damage over the startup period and some period of initial operation. maximize compliance to plan and maximize productivity. Various machine states may be used for training including ambient temperature, battery temperature, battery health, charge capacity, data from other machine sensors, information from nearby machines via the central office 228 or peer-to-peer communications among BEMs, machine performance history, and predicted energy use. When the BEM 100 is operating in an area with limited network coverage, i.e., no connection to the central office 228, the BEM 100 may use peer-to-peer communications via the communication module 130 with nearby machines to determine when to enter the low power mode. For example, when queuing at a loading tool, a crusher, or a dump site, the BEM 100 may communicate with nearby machines to negotiate a predicted idle time. Where machine learning is used, various machine states may be used for training including location of the BEM 100 and nearby machine, via GPS for example, travel constraints, such as (no passing allowed, predicted startup times, charge capacity, information from the nearby machines via the peer-to-peer communications, machine performance history, and the priority of assigned work. For example, priority may be given to machines working on a Blend, feeding a saturated loading tool, or feeding a crusher.

Figure 3:
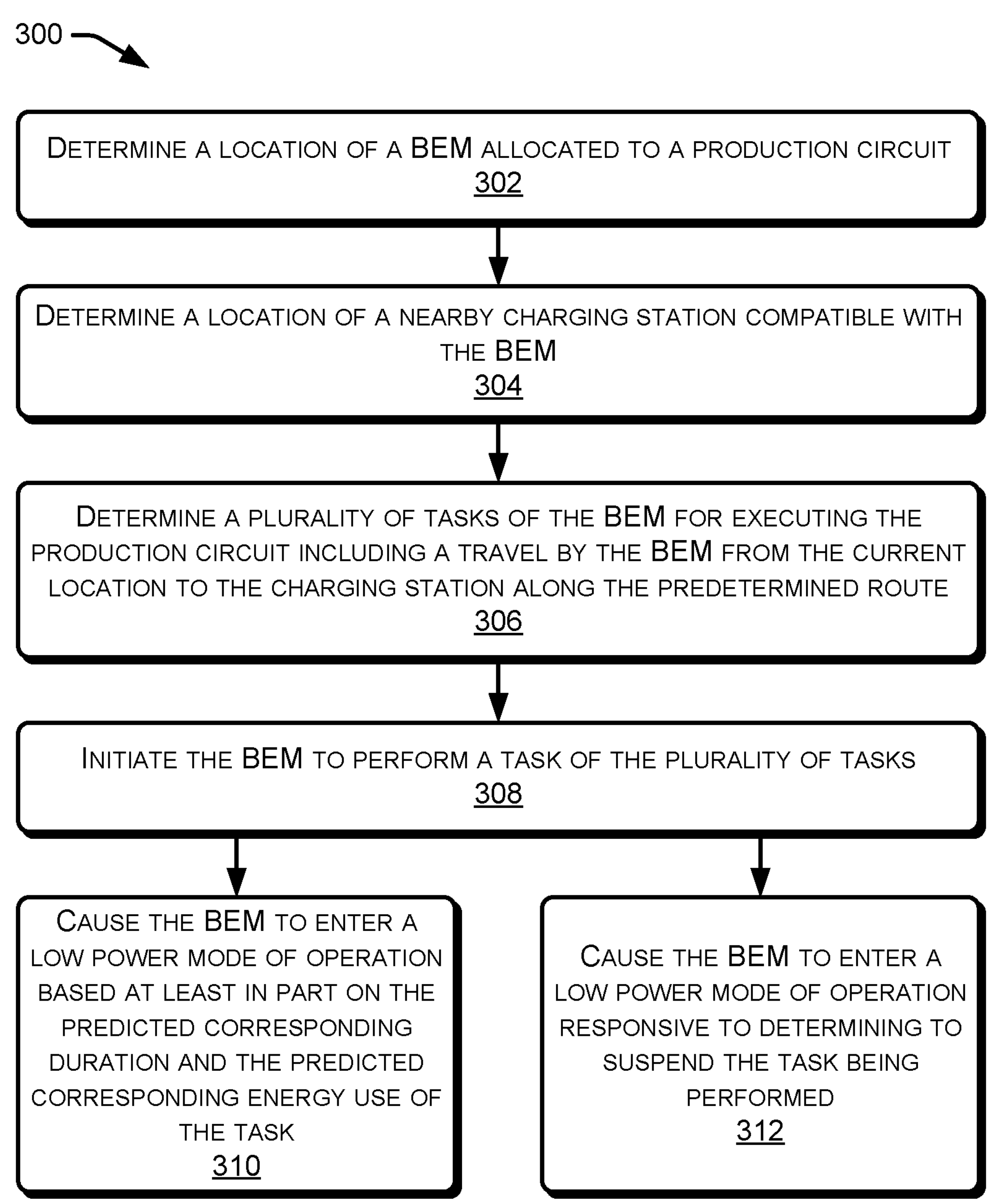
FIG. 3 is a flowchart illustrating a process for entering a low power mode of operation for a BEM.

FIG. 3 is a flowchart 300 illustrating a process for entering a low power mode of operation for a battery electric machine (BEM). The flowchart 300 is illustrated as a logical flow graph, with reference to FIG. 2, operation of which represents a sequence of operations that can be implemented in hardware, software, or a combination thereof.

At block 302, a location of the BEM 100 allocated to the production circuit 204 may be determined. For example, the one or more processors 122 of the ECM 120 of the BEM 100 and/or the computing system 226 of the central office 228 may determine the location by utilizing global positioning system (GPS) data associated with the BEM 100. The BEM 100 may be a representative BEM instead of a particular individual BEM. At block 304, a location of a nearby charging station compatible with the BEM, such as the charging station 218 may be determined. Additionally, or alternatively, a location of another, or an alternate, nearby charging station 222 may also be determined. The locations of the charging stations may also be obtained from a database of the computing system 226. Additionally, or alternatively, the locations of the BEM 100 and charging stations 218 and 222 may be determined, or obtained, by utilizing a non-GPS based process or technique, such as a landmark based location/localization (LBL) navigation and a perception based location (PBL) navigation which determine locations by observing known landmarks, and possibly including markers or targets, or a Ground Sensing Location (GSL) navigation where radar, or other detection techniques, is used to determine location based on known ground anomalies.

At block 306, a plurality of tasks of the BEM 100 for executing the production circuit 204 may be determined including a travel by the BEM 100 from the current location to the charging station 218 along the predetermined route 220. Determining the plurality of tasks at block 306 may include predicting a corresponding duration and a corresponding energy use of each task of the plurality of tasks. The corresponding duration may be further segmented to a plurality of time intervals of the same or different length in time, and an associated energy use during each interval may be predicted. For example, the associated energy usages may include the energy predicted to be used by the BEM 100 in the next minute, two minutes, five minutes, ten minutes, twenty minutes and thirty minutes, or longer, and may additionally predict how much work the BEM 100 may be performing during those time intervals and predict a corresponding segment energy use of each time interval, i.e., how much energy is used during those time intervals. As described above with reference to FIG. 2, the plurality of tasks, i.e., one or more planned tasks, may include one or more routine tasks of the BEM 100 associated with executing the production circuit 204 with known energy amount requirements to complete the one or more routine tasks and a number of repetitions of the one or more routine tasks to be performed by the BEM 100. Such a known set of task energy amounts or uses may be referred as an energy use profile for the production circuit. For example, the computing system 226 of the central office 228 may provide an energy use profile for the production circuit to the BEM 100. The plurality of tasks may include loading and/or unloading material, transporting the material 206 to one or more delivery zones, dumping/delivering the material at delivery zones, watering at a location, traveling to a refilling station, refilling water at traveling station, grading, traveling to another location, grading, travelling to a park up, and others like. Additionally, a plurality of alternative tasks of the BEM 100 in an alternative production circuit may be determined, and an alternate task energy amount associated with the plurality of alternative planned tasks including a travel to the charging station 218 in the alternative production circuit may be determined. The BEM 100 may perform the plurality of alternative planned tasks in the alternative production circuit in case entry criteria for the production circuit 204 are not met, for example, the BEM 100 being loaded with unexpected material but able to perform in the alternative production circuit. As described above with reference to FIG. 2, a task energy amount, i.e., an amount of energy required to perform each of the plurality of tasks, may be known, for example, from historical performance of the task by the BEM 100 associated with the production circuit 204, a heuristic algorithm for estimating the corresponding duration of each task of the plurality of tasks, a simulation of the plurality of tasks for estimating the corresponding duration of each task of the plurality of tasks, a stochastic model for estimating the corresponding duration of each task of the plurality of tasks, and/or a machine learning for estimating the corresponding duration of each task of the plurality of tasks.

At block 308, the BEM 100 may be initiated to perform a task of the plurality of tasks, and the BEM 100 may enter, or be caused to enter, a low power mode of operation based at least in part on the predicted corresponding duration and the predicted corresponding energy use of the task at block 310. For example, where a haul truck, such as the BEM 100, may be sent to be loaded by a wheel loader, such as the BEM 202, it may take ten to fifteen minutes for the BEM 100 to be loaded based on a payload of the BEM 100 being much larger compared to a bucket of the BEM 202. It may, therefore, be appropriate for the BEM 100 to enter the low power mode by shutting down some of its systems during this loading period. Where the BEM 100 is required to queue for the BEM 202 (the queuing being a task) and the length of the queuing period (the duration of the task) is not predicted to be long enough to warrant entering the low power mode, the BEM 100 may still enter the low power mode knowing that the BEM 100 is predicted to subsequently be idle for some time while being loaded.

Additionally, or alternatively, the BEM 100 may enter, or be caused to enter, a low power mode of operation responsive to determining to suspend the task being performed at block 312 after block 308. For example, the BEM 100 may travel from point A heading towards point B, and encounter an interruption, such a section of the road being blocked, or a mobile charging station for charging the BEM 100 may be on delay for some period of time. Under these, and similar, situations, a determination may be made to suspend the task the BEM 100 is currently performing and the BEM 100 may enter, or may be caused to enter, the low power mode.

Figure 4:
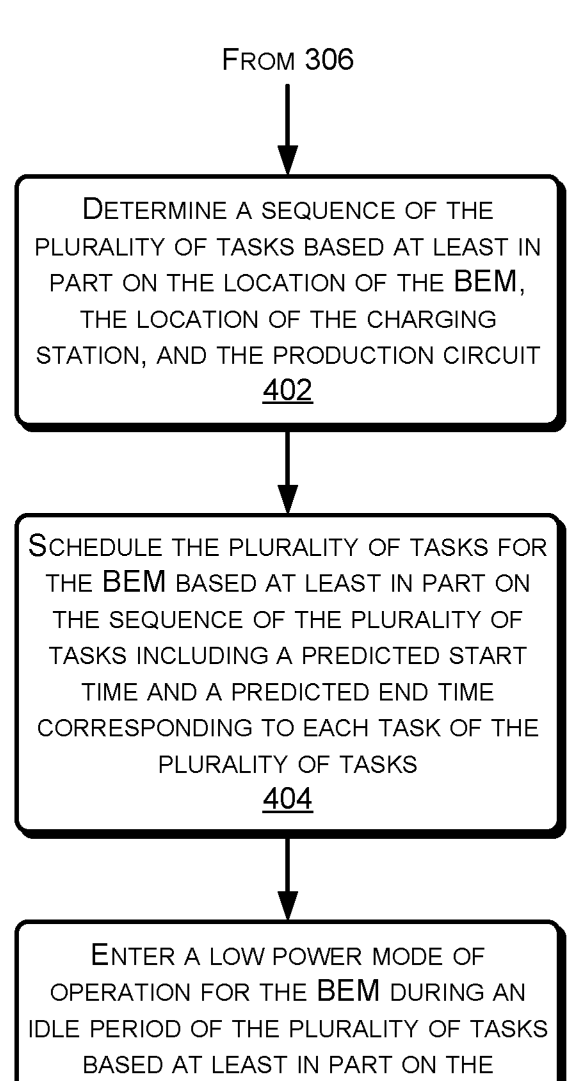
FIG. 4 is a flowchart representing an example additional process from one of the blocks of FIG. 3.

FIG. 4 is a flowchart representing an example additional process from block 306 of FIG. 3. At block 402, a sequence of the plurality of tasks may be determined based at least in part on the location of the BEM 100, the location of the charging station 218, and the production circuit 204. The sequence may include a corresponding predicted start time and a corresponding predicted end time of each task of the plurality of tasks. Based at least in part on the sequence of the plurality of tasks determined at block 402, the plurality of tasks for the BEM 100 may be scheduled including a predicted start time and a predicted end time corresponding to each task of the plurality of tasks at block 404. At block 406, the BEM 100 may enter, or may be automatically caused to enter by the computing system 226, a low power mode of operation during an idle period of the plurality of tasks based at least in part on the scheduled plurality of tasks where the idle period is a time period between two active tasks of the plurality of tasks as described above with reference to FIG. 2. For example, the BEM 100 may enter the low power mode of operation at a predicted start time of the idle period or at a predicted end time of a first active task of the two active tasks as determined at block 402.

Figure 5:
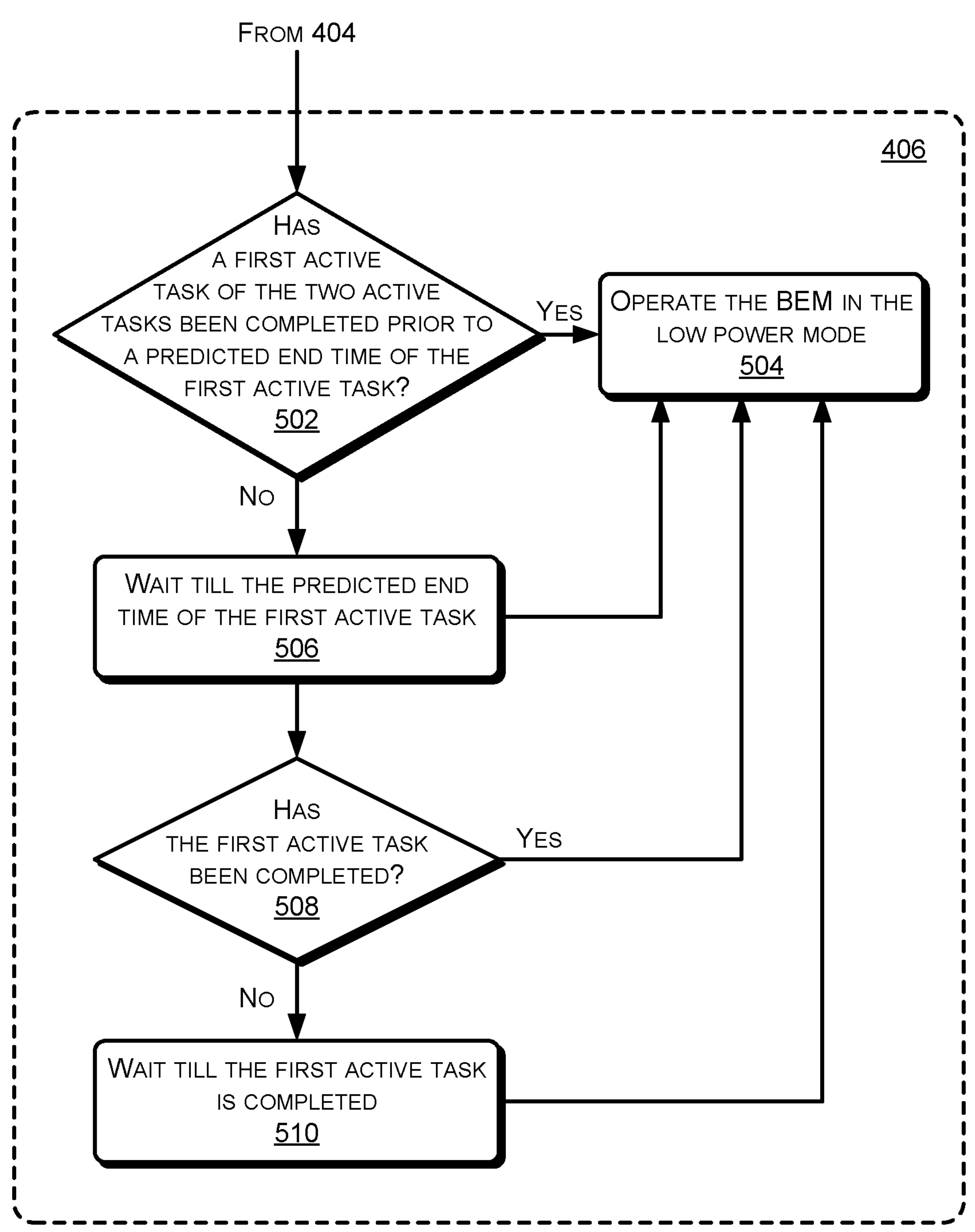
FIG. 5 is a flowchart representing an example detail process of one of the blocks of FIG. 4.

FIG. 5 is a flowchart representing an example detail process of block 406 of FIG. 4. At block 502, whether a first active task of the two active tasks has been completed prior to a predicted end time of the first active task may be determined. For example, the BEM 202 used to load material 206 onto the BEM 100, as described above with reference to FIG. 2, has a higher capacity than the model corresponding BEM used in determining the plurality of tasks, and the task associated with the BEM 202 has been completed prior to the predicted end time, or a task associated with traveling the route 216 may have determined with a detour, which is now removed and the BEM 100 is able to reach the next destination earlier than the corresponding predicted time. At block 504, in response to determining that the first active task has been completed prior to the predicted end time of the first active task ("YES" branch), the BEM 100 may enter, or may be automatically caused to enter by the computing system 226, the low power mode at the time of, or shortly after, the completion of the first active task without waiting till the predicted end time of the first task. In response to determining that the first active task has not been completed prior to the predicted end time of the first active task ("NO" branch), the BEM 100 may wait, or may be automatically caused to wait by the computing system 226, till the predicted end time of the first task at block 506, then enter the low power mode at block 504.

Additionally, or alternatively, after waiting till the predicted end time of the first task at block 506, whether the first active task has been completed at the time of the predicted end time of the first task may be determined at block 508. In response to determining that the first active task has been completed at the time of the predicted end time of the first task ("YES" branch), the BEM 100 may enter, or may be automatically caused to enter by the computing system 226, the low power mode at the time of, or shortly after, the completion of the first active task at block 504. In response to determining that the first active task has not been completed at the time of the predicted end time of the first task, i.e., the first active task is still in progress ("NO" branch), the BEM 100 may delay, or may be automatically caused to delay by the computing system 226, entering the low power mode by waiting till the first active task has been completed at block 510, and then enter, and be operated in, the low power mode at the time of, or shortly after, the completion of the first active task at block 504.

Figure 6:
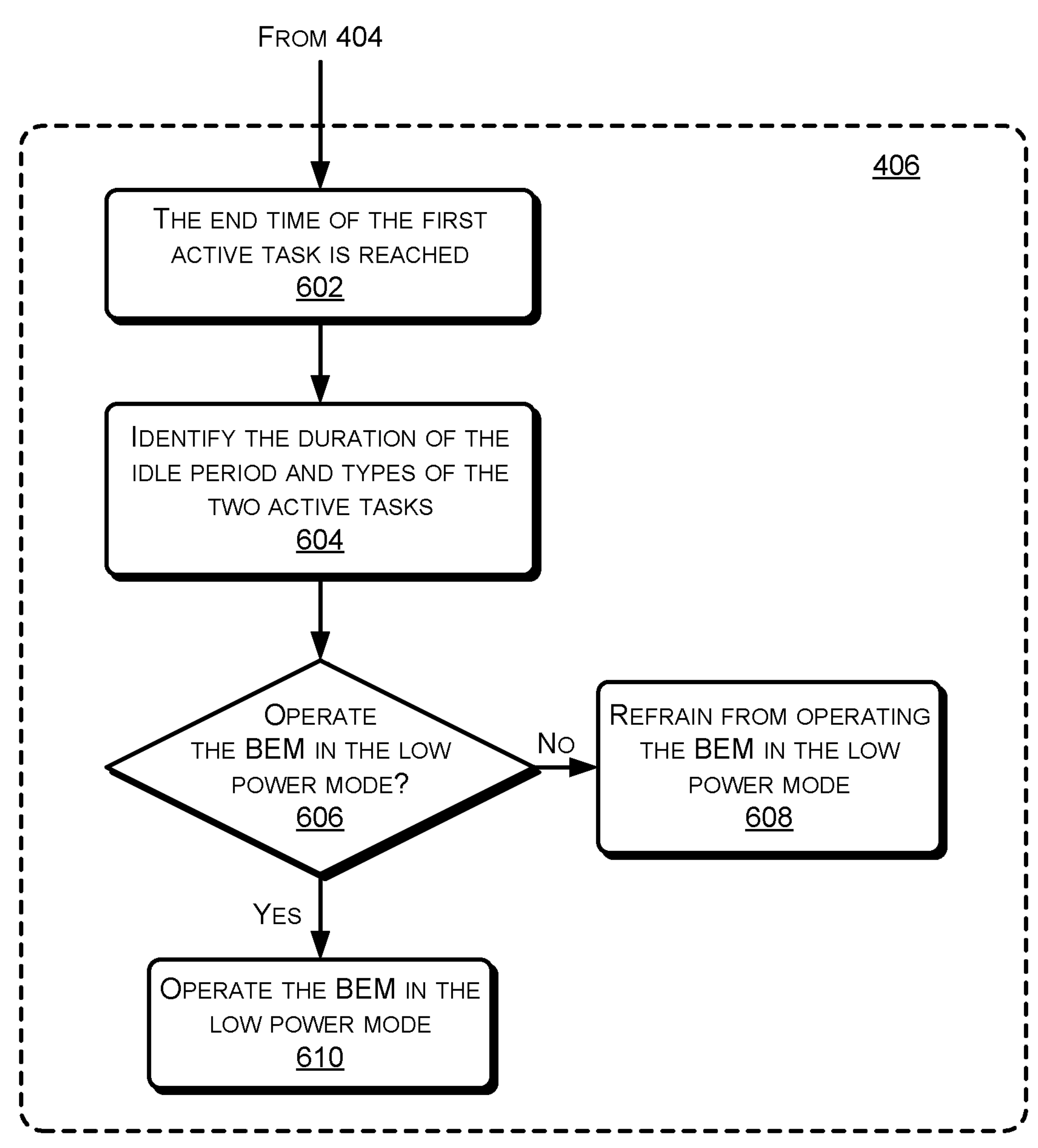
FIG. 6 is a flowchart representing another example detail process of one of the blocks of FIG. 4.

FIG. 6 is a flowchart representing another example detail process of block 406 of FIG. 4. At block 602, the predicted end time of the first active task is reached, and the duration of the idle period and types of the two active tasks are identified at block 604 based on the plurality of tasks determined at block 306 of FIG. 3 and the sequence determined at block 402 of FIG. 4. At block 606, whether to operate the BEM 100 in the low power mode is determined based on the duration of the idle period and types of the two active tasks. For example, if the duration of the idle period is predicted to be very short, and the two active tasks require a large and similar amount of power, then turning off various components of the BEM 100 to enter the low power mode, then turning them back on after the short period may not save energy, and may even be harmful to some components, such as the batteries 112. It may require more energy than if the BEM 100 were to keep operating without entering the low power mode due to additional energy and power required to re-start some of the components of the BEM 100, such as pressurizing the hydraulic cylinders 106. The BEM 100 may then refrain, or may be caused to refrain, from entering the low power mode at block 608. Additionally, or alternatively, the BEM 100 may delay, or may be caused to delay, entering the low power mode at block 608 until a predicted start time of the next idle period. At block 610, the BEM 100 may enter, or may be caused to enter, the low power mode at the predicted start time of the idle period and remain in the low power mode beyond a predicted start time of a second active task of the two active tasks where the predicted energy use of the second active task is predicted to be low or moderate, for example, a return to optimal operating conditions is not required, such as heating the batteries 112.

Figure 7:
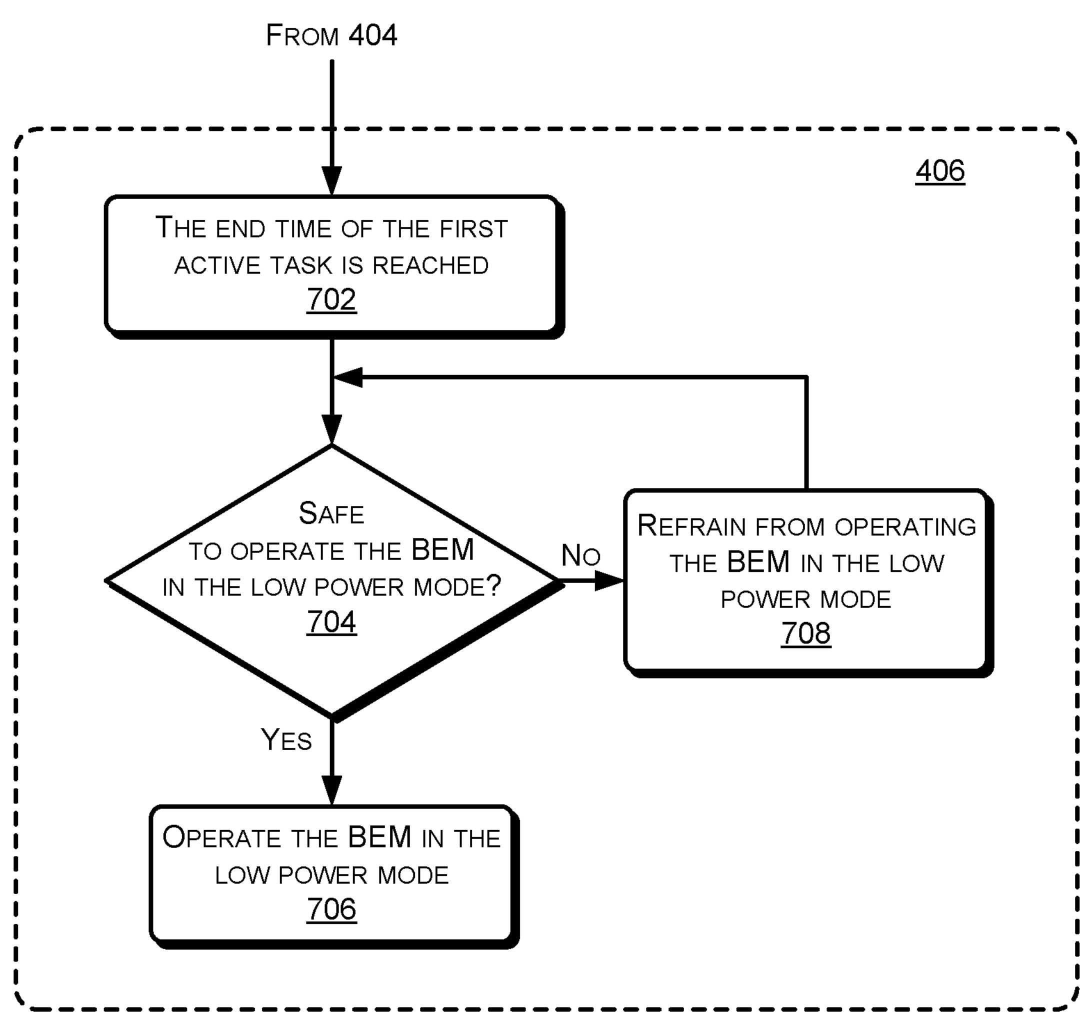
FIG. 7 is a flowchart representing another example detail process of one of the blocks of FIG. 4.

FIG. 7 is a flowchart representing another example detail process of block 406 of FIG. 4. At block 702, the end time of the first active task is reached, and whether it is safe for the BEM 100 to enter the low power mode is determined at block 704. For example, it may not be safe to stop the BEM 100 on a busy street or at an intersection during the idle period. In response to determining that it is safe for the BEM 100 to enter the low power mode at block 704, the BEM 100 may enter, or may be caused to enter, the low power mode at block 706. In response to determining that it is not safe for the BEM 100 to enter the low power mode at block 704, the BEM 100 may refrain, or may be caused to refrain, from entering the low power mode at block 708. Additionally, or alternatively, the BEM 100 may delay, or may be caused to delay, entering the low power mode at block 708 until it is determined to be safe to enter the low power mode by looping back to block 704 from block 708. For example, the BEM 100 may continue traveling on the road till it reaches a designated location for idling.

The processes described above with reference to FIGS. 3-7 may be combined and performed in parallel or in series. Additionally, or alternatively, the processes described above with reference to FIGS. 3-7 may be overridden by an operator of the BEM 100 directly at the BEM 100 or remotely via the computing system 226 of the central office 228.

Figure 8:
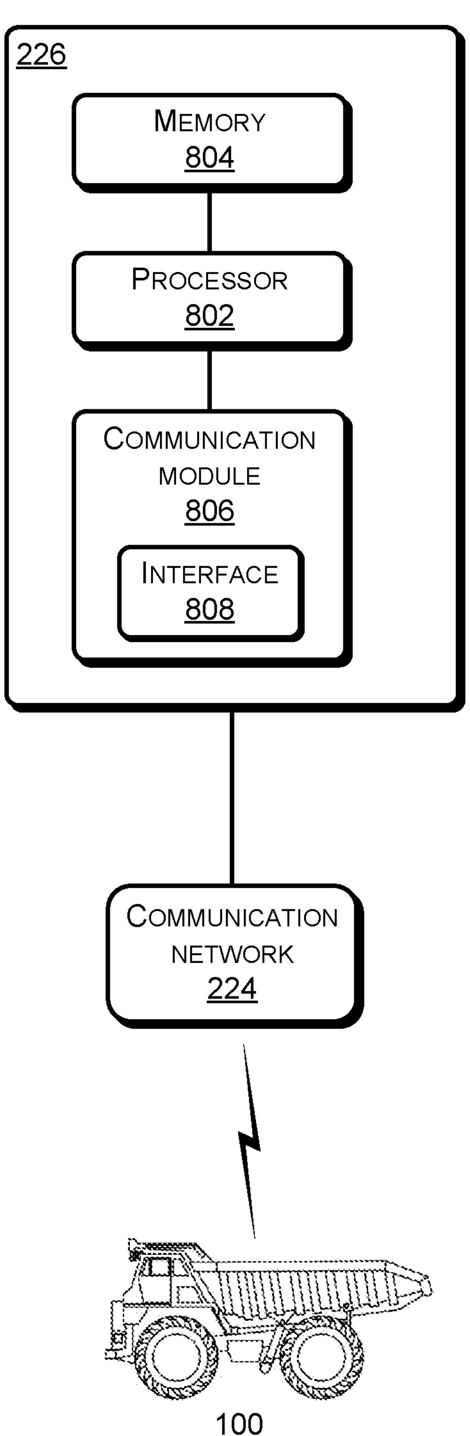
FIG. 8 is a block diagram of a computing system for directing a BEM to operate in a low power mode.

FIG. 8 is a block diagram of the computing system 226 for directing a BEM, such as the BEM 100, to operate in a low power mode. For the purpose of discussion, unless otherwise specified, FIG. 8 will be described below with respect to the processor 802 of the computing system 226 performing the method and steps described above with reference to FIGS. 2-7. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process. The computing system 226 may also embody single or multiple microprocessors, field programmable gate arrays (FPGAs), digital signal processors (DSPs), programmable logic controllers (PLCs), etc.

The computing system 226 may be hosted by a single server or distributedly hosted by a plurality of servers in a cloud environment. The computing system 226 may comprise the processor 802, a memory 804 communicatively coupled to the processor 802, and a communication module 806 communicatively coupled to the processor 802. The communication module 806 may include an interface 808, such as a user interface and input/output (I/O) module capable of receiving inputs and providing outputs. The inputs and outputs may be communicated to and from the communication module 806 via the communication network 224. As described above with reference to FIG. 2, the communication network 224 may be a cellular network, Wi-Fi® network, or any other type of network. In some examples, the BEM 100 may use the communication network 224 to report location data and/or other types of data to the computing system 226, such that the computing system 226 may track the location of the BEM 100 on the worksite 200, and the computing system 226 may communicate data and instructions to the BEM 100 via the communication network 224.

In some examples, the processor 802 may include a central processing unit (CPU), a graphics processing unit (GPU), both CPU and GPU, or other processing units or components known in the art. Additionally, the processor 802 may possess its own local memory, which also may store program modules, program data, and/or one or more operating systems. The memory 804 may comprise computer-readable media, which may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the computing system 226. In some examples, one or more of the modules may include, or be associated with, computer-executable instructions that are stored by the computer-readable media and that are executable by one or more processors to perform such operations. For example, the memory 804 may store processor-executable instructions that, when executed by the processor 802 of the computing system 226, cause the processor 802 to perform operations for directing a BEM, such as the BEM 100, to operate in a low power mode as described above with reference to FIGS. 3-7.

The software and or functionality of the system(s), component(s), algorithms, cloud(s), platform(s), etc., discussed above with reference to FIGS. 2-7 regarding directing a BEM, such as the BEM 100, to operate in a low power mode may be combined in different ways depending on design requirements, ease of construction and/or integration, cost, etc. Accordingly, while these elements have been separated for purposes of discussion, they may be combined, as appropriate, during implementation.

The computing system 226 may be configured to use artificial intelligence for maintaining synchronization between centralized (cloud-based) and distributed models. The computing system 226 may include a centralized or cloud-based computer processing system located in one or more of a back-office server or a plurality of remote servers, one or more distributed, edge-based computer processing systems separately located with each of the distributed computer processing systems communicatively connected to the centralized computer processing system.

A machine learning engine may be included in at least one of the centralized and distributed computer processing systems, such as the computing system 226. The machine learning engine may train a learning system using the training data to enable the machine learning engine to safely mitigate a divergence discovered between first and second sets of output control commands using a learning function including at least one learning parameter. Training the learning system may include providing the training data as an input to the learning function. The learning function may be configured to use the at least one learning parameter to generate an output based on the input, cause the learning function to generate the output based on the input, and compare the output to one or more of the first and second sets of output control commands to determine a difference between the output and the one or more of the first and second sets of output control commands. The learning function may modify the at least one learning parameter and the output of the learning function to decrease the difference responsive to the difference being greater than a threshold difference and under a variety of different conditions.

INDUSTRIAL APPLICABILITY

The example systems and methods of the present disclosure are applicable for entering a low power mode of operation for a battery electric machine (BEM), such as an automobile, a truck, an agricultural vehicle, an aircraft, a watercraft, and/or work vehicles, such as a track loader, a skid-steer loader, a grader, an on-highway truck, an off-highway truck, and/or any other machine known to a person skilled in the art. The systems and methods described herein may be used to cause the BEM allocated to a production circuit to enter the low power mode of operation based at least in part on a predicted duration and a predicted energy use of a task to minimize total energy use, minimize battery damage, and maximize productivity. For example, instead of idling for a predetermined period before entering the low power mode, the BEM may enter the low power mode immediately based on a predicted energy use, thus reducing energy use. By reducing the energy use, the batteries experience less changes, which may help longevity of the batteries, and more energy is available for productivity. Safety of, or associated with, the BEM may be enhanced by checking conditions of, or the surrounding of, the BEM before entering the low power mode, and if appropriate, delay entering the low power mode.

A computing system determines a location of the BEM and a location of a nearest charging station compatible with the BEM, and based at least in part on the location of the BEM, the location of the charging station, and the production circuit, determines a plurality of tasks of the BEM for executing the production circuit, predicting a corresponding duration of each task of the plurality of tasks, and predicting a corresponding energy use of each task of the plurality of tasks. The computing system initiates the BEM to perform a task of the plurality of tasks, and cause the BEM to enter a low power mode of operation based at least in part on the predicted corresponding duration and the predicted corresponding energy use of the task. The computing system additionally, or alternatively, determine a sequence of the plurality of tasks based at least in part on the location of the BEM, the location of the charging station, and the production circuit with the sequence including a corresponding predicted start time and a corresponding predicted end time of each task of the plurality of tasks, based at least in part on the sequence, schedules the plurality of tasks for the BEM to perform and cause the BEM to enter a low power mode of operation during an idle period of the plurality of tasks based at least in part on the scheduled plurality of tasks. The computing system delays causing the BEM to enter the low power mode of operation during the idle period based on the duration of the idle period and types of the two active tasks, responsive to determining that a first active task of the two active tasks is in progress beyond a predicted end time of the first active task, and based on safety associated with the BEM at the predicted start time of the idle period.

Unless explicitly excluded, the use of the singular to describe a component, structure, or operation does not exclude the use of plural such components, structures, or operations or their equivalents. The use of the terms “a” and “an” and “the” and “at least one” or the term “one or more,” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B” or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word “or” refers to any possible permutation of a set of items. For example, the phrase “A, B, or C” refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A method comprising:

determining a location of a battery electric machine (BEM) allocated to a production circuit;

determining a location of a charging station compatible with the BEM;

based at least in part on the location of the BEM, the location of the charging station, and the production circuit:

determining a plurality of tasks of the BEM for executing the production circuit, determining a sequence of the plurality of tasks, wherein determining the sequence includes determining:

a predicted start time, a predicted end time, and a predicted duration of one or more sequential tasks of the plurality of tasks and of an idle period corresponding to the one or more sequential tasks, and predicting an energy use of the one or more sequential tasks and of the idle period;

scheduling the one or more sequential tasks to be performed by the BEM based on the sequence;

initiating the BEM to perform the one or more sequential tasks; and causing the BEM to enter a low power mode of operation during the idle period based at least in part on the predicted duration of the one or more sequential tasks, the predicted start time of the one or more sequential tasks, the predicted end time of the one or more sequential tasks, and the predicted energy use of the one or more sequential tasks.

2. The method of claim 1, further comprising:

causing the BEM to enter the low power mode responsive to determining to suspend the one or more sequential tasks being performed.

3. The method of claim 1, wherein causing the BEM to enter the low power mode includes causing the BEM to enter the low power mode determined by using at least one of:

a heuristic algorithm for estimating a corresponding duration and a corresponding energy use of each task of the plurality of tasks, a simulation of the plurality of tasks for estimating the corresponding duration and the corresponding energy use of each task of the plurality of tasks, a stochastic model for estimating the corresponding duration and the corresponding energy use of each task of the plurality of tasks, or a machine learning algorithm for estimating the corresponding duration and the corresponding energy use of each task of the plurality of tasks.

4. The method of claim 1, wherein predicting the energy use of the one or more tasks includes:

segmenting the duration of the one or more tasks into a plurality of time intervals, and predicting a segment energy use of each time interval of the plurality of time intervals.

5. The method of claim 1, wherein determining the plurality of tasks includes determining the plurality of tasks based on at least one of:

one or more routine tasks of the BEM associated with the production circuit, or one or more tasks historically performed by the BEM associated with the production circuit.

6. The method of claim 1, wherein:

causing the BEM to enter the low power mode during the idle period is further based at least in part on the one or more sequential tasks, the predicted duration of the idle period, and the predicted energy use of the idle period.

7. The method of claim 6, wherein causing the BEM to enter the low power mode during the idle period includes causing the BEM to operate in the low power mode from the predicted start time of the idle period.

8. The method of claim 6, wherein causing the BEM to enter the low power mode during the idle period further includes at least one of:

delaying causing the BEM to enter the low power mode during the idle period based on determining a road condition surrounding the BEM for safety associated with the BEM at the predicted start time of the idle period, or delaying causing the BEM to enter the low power mode during the idle period based on the predicted duration of the idle period.

9. The method of claim 1, wherein the idle period is a time period;

beginning at an end time of the one or more sequential tasks, ending at a start time of the one or more sequential tasks, or extending from the one or more sequential tasks to a subsequent task of one or more sequential tasks.

10. The method of claim 9, wherein causing the BEM to enter the low power mode during the idle period includes at least one of:

causing the BEM to operate in the low power mode from the predicted end time of the one or more sequential tasks, or causing the BEM to operate in the low power mode responsive to determining the one or more sequential tasks being completed prior to a predicted end time of the one or more sequential tasks.

11. The method of claim 9, wherein causing the BEM to enter the low power mode during the idle period includes:

determining to operate the BEM in the low power mode based on the duration of the idle period and types of the one or more sequential tasks and the subsequent one or more sequential tasks.

12. The method of claim 9, wherein causing the BEM to enter the low power mode during the idle period further includes at least one of:

delaying causing the BEM to enter the low power mode during the idle period until the BEM reaches a designated location for idling, or delaying causing the BEM to enter the low power mode during the idle period based on the duration of the idle period and types of the one or more sequential tasks and the subsequent one or more sequential tasks.

13. The method of claim 9, wherein causing the BEM to enter the low power mode during the idle period includes:

delaying causing the BEM to enter the low power mode during the idle period responsive to determining that the one or more sequential tasks is in progress beyond a predicted end time of the one or more sequential tasks.

14. A system comprising:

a processor; and a memory communicatively coupled to the processor, the memory storing thereon processor-executable instructions that, when executed by the processor, cause the processor to:

determine a location of a battery electric machine (BEM) allocated to a production circuit;

determine a location of a charging station compatible with the BEM;

based at least in part on the location of the BEM, the location of the charging station, and the production circuit:

determine a plurality of tasks of the BEM for executing the production circuit, determine a sequence of the plurality of tasks, the sequence including:

a predicted start time, a predicted end time, and a predicted duration of one or more sequential tasks of the plurality of tasks and of an idle period corresponding to the one or more sequential tasks, and predicting an energy use of the one or more sequential tasks and of the idle period;

scheduling the one or more sequential tasks to be performed by the BEM based on the sequence;

initiate the BEM to perform the one or more sequential tasks;

determine to cause the BEM to enter a low power mode of operation based at least in part on the predicted duration and the predicted energy use of the one or more sequential tasks;

determine a road condition surrounding the BEM for safety associated with the BEM; and delay causing the BEM to enter the low power mode during the idle period based on the determined road condition surrounding the BEM, the predicted duration of the one or more sequential tasks, the predicted start time of the one or more sequential tasks, the predicted end time of the one or more sequential tasks, and predicted energy use of the one or more sequential tasks.

15. The system of claim 14, wherein the processor-executable instructions further cause the processor to:

determine a plurality of alternative tasks of the BEM in an alternative production circuit, the plurality of alternative tasks different from the plurality of tasks, and the alternative production circuit different from the production circuit, and determine an alternate task energy amount associated with the plurality of alternate tasks.

16. The system of claim 14, wherein the processor-executable instructions further cause the processor to:

cause the BEM to enter the low power mode during the idle period further based at least in part on the one or more sequential tasks, the predicted duration the idle period, and the predicted energy use of the idle period.

17. The system of claim 15, wherein the processor-executable instructions further cause the processor to:

cause the BEM to perform the plurality of alternative tasks responsive to determining entry criteria for the production circuit are not met.

18. A non-transitory computer-readable medium storing thereon processor-executable instructions that, when executed by a processor of a system, cause the processor to perform operations, the operations comprising:

determining a location of a battery electric machine (BEM) allocated to a production circuit;

determining a location of a charging station compatible with the BEM;

based at least in part on the location of the BEM, the location of the charging station, and the production circuit:

determining a plurality of tasks of the BEM for executing the production circuit, determining a sequence of the plurality of tasks, wherein determining the sequence includes determining:

a predicted start time, a predicted end time, and a predicted duration of one or more sequential tasks of the plurality of tasks and of an idle period corresponding to the one or more sequential tasks, and predicting an energy use of the one or more sequential tasks and of the idle period;

scheduling the one or more sequential tasks to be performed by the BEM based on the sequence;

initiating the BEM to perform the one or more sequential tasks; and causing the BEM to enter a low power mode during the idle period based at least in part on the predicted duration of the one or more sequential tasks, the predicted start time of the one or more sequential tasks, the predicted end time of the one or more sequential tasks, and the predicted energy use of the one or more sequential tasks.

19. The non-transitory computer-readable medium of claim 18, wherein causing the BEM to enter the low power mode during the idle period includes causing the BEM to enter the low power mode based at least in part on the one or more sequential tasks, the predicted duration of the idle period, and the predicted energy use of the idle period.

20. The non-transitory computer-readable medium of claim 18, wherein causing the BEM to enter the low power mode during the idle period includes:

delaying causing the BEM to enter the low power mode during the idle period based on determining a road condition surrounding the BEM at the predicted start time of the idle period.

* * * * *